United States Patent [19]

Iwako

[11] 4,336,851
[45] Jun. 29, 1982

[54] LOOP CONVEYOR TYPE FLOW WEIGHER

[75] Inventor: Hiroyuki Iwako, Tokyo, Japan

[73] Assignee: Funken Co., Ltd., Japan

[21] Appl. No.: 178,016

[22] Filed: Aug. 13, 1980

[30] Foreign Application Priority Data

Aug. 14, 1979 [JP] Japan .................................. 54/102834

[51] Int. Cl.$^3$ ............................................ G01G 11/06
[52] U.S. Cl. .......................................... 177/16; 222/77
[58] Field of Search ................ 73/861.02, 861.03, 218;
177/16, 145; 222/55, 58, 77

[56] References Cited

U.S. PATENT DOCUMENTS

| 1,717,564 | 6/1929 | Ihlefeldt | 222/77 |
| 2,751,115 | 6/1956 | Kindseth | 222/77 |
| 3,561,643 | 2/1971 | Kloven | 222/55 |

Primary Examiner—Herbert Goldstein
Attorney, Agent, or Firm—Wenderoth, Lind & Ponack

[57] ABSTRACT

A loop conveyor, nearly round viewed in a plane, has a ring-shaped or loop path for carrying powder material. A material discharge port is provided oppositely to a material receiving port, away by a semicircle therefrom, so that such material may be carried half in the ring-shaped path. The loop conveyor thus arranged is supported by a balance mechanism at two points on the line of the loop diameter which passes the material receiving and discharge ports. The loop conveyor thus balanced rests on a detector, such as a load cell, for electrical detection of a load applied thereto, which is provided orthogonally to the loop diameter. The weight of powder which is continuously carried in a semicircle through the loop path is checked electrically by means of the detector, and a flow rate can be obtained in relation to the weight. A special kind of powder is received and carried continuously in several section rooms formed in the loop path.

5 Claims, 5 Drawing Figures

LOOP CONVEYOR TYPE FLOW WEIGHER

BACKGROUND OF THE INVENTION

This invention relates to a flow weigher for determining the weight and flow rate of a powder material in a continuous feed process, and more particularly to a loop-conveyor-type flow weigher for detecting the weight and flow rate of powder material by use of a loop conveyor which has a ring-shaped path for carrying or conveying such material.

Generally, powder has no fluidity except for a special kind of powder, which will be described hereinafter. Accordingly it is quite difficult to check the weight or flow rate of powder in any continuous powder feed system. This is not merely because of difficulty in the conveyance of powders at a constant rate, but also because of their quite different behavior depending on their type and environment.

There are used prior-art continuous powder flow weighers of a belt conveyor type where the weight of powder which is carried on the belt is checked in the process of transfer by means of the belt conveyor which is running straight, and those of a screw conveyor type where the weight of powder is determined in the process of screw conveyance.

In these weighing systems, however, some of powder or fine particles will stick to a belt or screw and other parts, even growing rather thick. Then, scale values obtained therefrom cannot be accurate due to increasing errors in the tare.

Known as a special kind of powder is powdered coal or pulverized coal, which has been used as fuel for large-scale burners. This material exhibits high fluidity and violent flushing. Conventional belt or screw conveyor type flow weighers as described above cannot be employed for this material. Such powder will flow out in a moment faster than the movement of a belt or run out instantly through a screw groove. This makes it impossible to detect the weight of this kind of powder.

An object of the invention is to provide a flow weigher which permits accurate detection of the weight and flow rate of powder in a continuous powder feed system.

Another object of the invention is to provide a flow weigher which permits constant-rate feed of such powder as pulverized coal, which may otherwise present a phenomenon of violent flushing, and accurate determination of the weight and flow rate of such powder.

Still another object of the invention is to provide a flow weigher which has several partition vanes between which section chambers are formed for carrying powder, especially powdered coal, said partition vanes having improved sealability.

SUMMARY OF THE INVENTION

A loop-conveyor-type flow weigher in accordance with the invention comprises a loop conveyor having a ring-shaped path for carrying powder, means for supporting the loop conveyor at two points on the line of the loop diameter by a balance mechanism, and an electrical load detector such as a load cell, which is provided orthogonally to the loop diameter. The loop conveyor has a port for receiving powder material, which is disposed on the same loop diameter as the supporting means at two points and a port for material discharge, which is disposed right oppositely to the receiving port and away by a semicircle therefrom. As means for carrying powder is provided rotary means which can transfer powder being fed from the receiving port continuously to the discharge port.

The weight of powder which is being carried continuously in the semicircular path in the loop conveyor is detected electrically by means of the detector as a load. A flow rate can be obtained in relation with the number of revolutions of the rotary means for carrying powder.

The loop conveyor is composed of, more in detail, a bottom disk having a loop wall formed on the periphery, a cover plate for the bottom disk, and the rotary means which is driven to rotate horizontally in a space formed between the bottom disk and the cover plate. The rotary means has an outer peripheral wall which is concentric with the loop wall in such a manner as to make the ring-shaped path between the two walls.

Rotary means for common kinds of powders has a stepped bottom ring which extends from the lower end of the outer peripheral wall so that material fed from the receiving port may be put and carried on the bottom ring, down to the discharge port in the semicircular path, where such powders are discharged.

Rotary means for such powder as pulverized coal which has the nature of violent flushing is provided with several partition vanes extending radially at equal intervals from the outer peripheral wall of a drive shaft, and section chambers for carrying such material are formed between the partition vanes. Each partition vane has a portion which slides on the loop wall, the bottom disk, and the cover plate. This sliding portion is so designed as to be sealed tightly. Thus, even such powder fed from the receiving port is led into the semicircular section rooms and is carried as normal down to the discharge port without occurrence of flushing.

BRIEF DESCRIPTION OF THE DRAWINGS

Shown in the accompanying drawings is one embodiment of a loop-conveyor-type flow weigher of the invention.

DETAILED DESCRIPTION OF THE PREFERRED EMBODIMENTS

Figure 1:
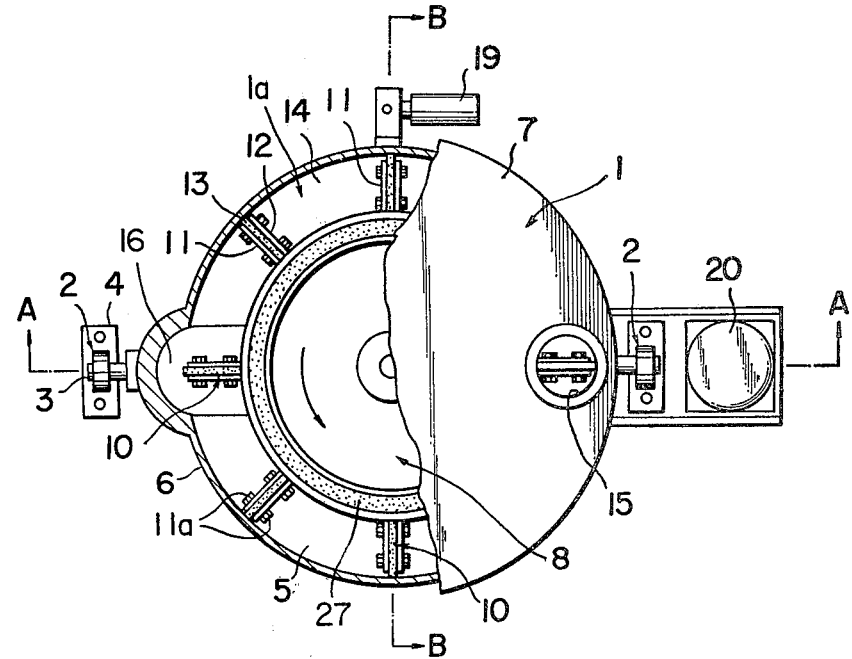
FIG. 1 is a plan view partly cut away of a cover plate.

In the drawing, 1 represents a ring-shaped or loop conveyor, which rests on supporting means 2 composed of bearings 4 and horizontal shafts 3 extending outward from both ends of the loop diameter and which is supported by a mechanism similar to a balance beam. The loop conveyor 1 is formed of a bottom disk 5 having a cylindrical or loop wall 6 provided on the periphery, a cover plate 7 for covering the bottom disk 5, and rotary means 8 for carrying powder material, which is driven to rotate horizontally in a space formed between the bottom disk 5 and the cover plate 7.

A drive shaft 9 in the rotary means 8 has an outer peripheral wall 9a which is concentric with the loop wall 6. A loop path 1a is formed between the outer peripheral wall 9a and the loop wall 6 for conveying powder material.

Figure 2:
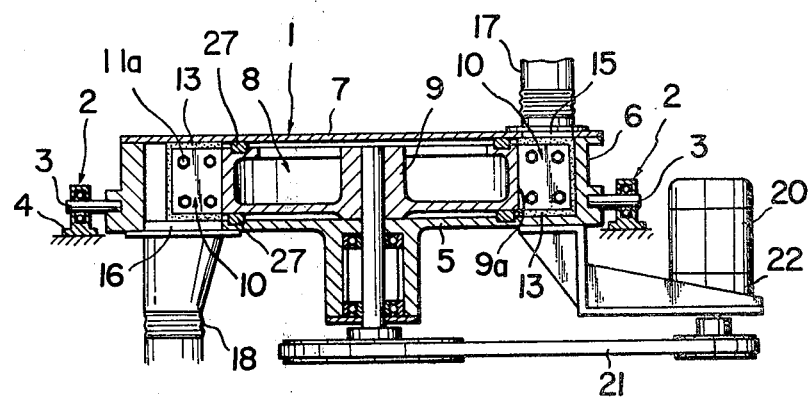
FIG. 2 is a cross-sectional view taken along line A—A in FIG. 1.
Figure 3:
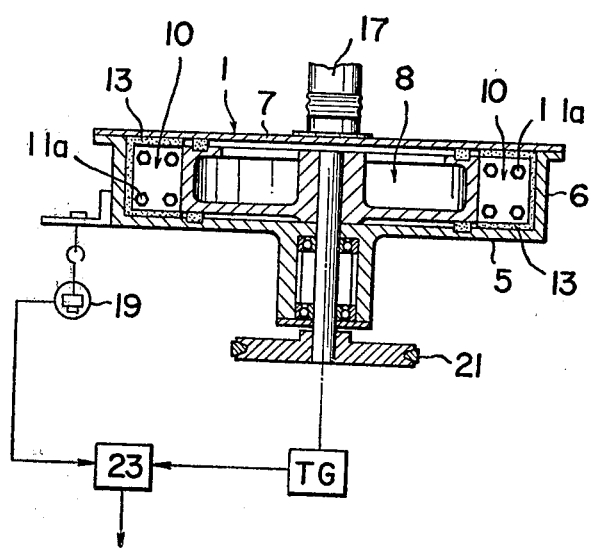
FIG. 3 is a cross-sectional view taken along line B—B in FIG. 1.

FIG. 1 to FIG. 3 show rotary means most suitable for carrying powder such as pulverized coal which may otherwise present a phenomenon of violent flushing. The rotary means shown here is provided with several partition vanes 10 which extend radially at equal intervals from the outer peripheral wall 9a for forming section chambers 14. Each partition vane 10 has a felt sheet 13 which is held between a vane member 12 fixed on the outer peripheral wall 9a and a holding member 12 in such a manner that the felt sheet 13 protrudes from and along the edge of the vane member 11. Thus the partition vanes 10 are sealed tightly at a portion which slides on the loop wall 6, the bottom disk 5 and the cover plate 7, and even a powder which has high fluidity is prevented from flowing out.

Experiments have been repeated on various materials including hard substances such as stainless steel for use as seal members for the partition vanes 10.

Powdered coal is sharply edged in profile, which cannot be observed with the naked eye, though. Accordingly powdered coal can serve as highly effective abrasives, which will wear seal members and wall surfaces. We have found most of seal materials tested defective and felt most desirable for the purpose in view of sealability, friction resistance, and heat resistance.

The loop conveyor 1 has a material receiving port 15 provided on the cover plate 7 on the same loop diameter as the horizontal shafts 3 and a material discharge port 16 provided on the bottom disk 5 right oppositely to the material receiving port 15 with a phase difference of 180 degrees therefrom. Flexible receiving and discharging tubes 17 and 18 are connected to the two ports respectively. To the receiving tube 17 is connected a feed port in an automatic constant-rate feeding system for powder which we invented separately for feeding powder at a constant rate through the receiving tube 17.

The loop conveyor 1 so arranged as described above rests on an electrical load detector 19 in this embodiment, which is disposed at right angles to the loop diameter alined with the horizontal shafts 3, 3. The load cell may be of a tension type or of a pressure type, which depends upon the position of mounting, and which is capable of electrically detecting the total weight of powder corresponding to the amount carried in the semicircular loop path from the material receiving port 15 to the material discharge port 16. In the drawing, 20 represents a driving motor for operating the rotary means 8 through transmission means such as belt 21, reduction gear 22, and other components. Such transmission means are provided as a whole as tare under the loop conveyor 1 preferably with symmetry to the axis of the horizontal shafts 3, 3. Thus no moment may be applied to the load cell by accidental external forces.

In another embodiment of the invention, which will be explained later with reference to FIGS. 4 and 5, a reduction motor is employed as a driving motor for operating the rotary means 8 directly by means of the motor shaft. In the drawing, TG represents a tachogenerator and 23 a multiplier.

If there is caused any imbalance in the weight of the loop conveyor 1, it can be balanced mechanically, for example, by addition of a balancer. The load cell is slightly loaded, and a signal resulting from such loading is set to zero. In this manner the weight of any powder material can be indicated easily and accurately, and a flow rate can also be obtained by the product of weight detected by the load cell and number of revolutions of the rotary means 8. That is, Flow rate = (Weight × Revolutions)/Time The rotary means 8 may be simplified in structure for processing common kinds of powder materials, as shown in FIGS. 4 and 5.

Figure 4:
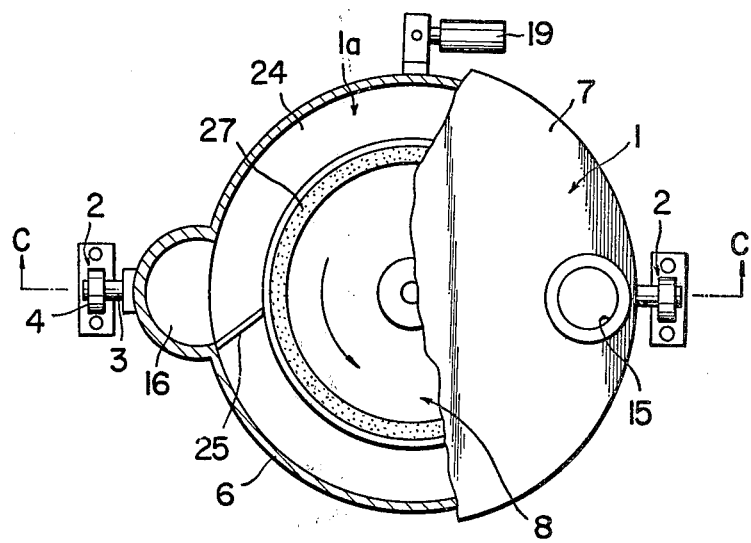
FIG. 4 is a plan view partly cut away of a cover plate, showing another form of rotary means for carrying powder.
Figure 5:
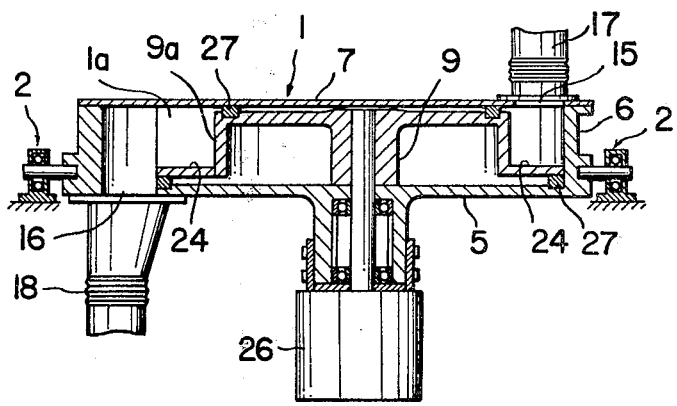
FIG. 5 is a cross-sectional view taken along line C—C in FIG. 4.

Rotary means 8 in FIGS. 4 and 5 has no partition vane but has a bottom ring 24, which extends from the lower end of the outer peripheral wall 9a, facing the loop path 1a closely. A discharge port 16 is provided on the loop wall 6, and a discharge gate 25 extends diagonally from the far end of the discharge port 16 up to the outer peripheral wall 9a on which the free end of the gate 25 slides. Thus, powder material fed from the receiving port 15 can be evenly put and carried on the bottom ring 24 down to the discharge gate 25 is then scraped off into the discharge port 16 by the gate 25 serving as a guide. This rotary means is substantially identical in other points with what is shown in FIGS. 1 to 3, and a reduction motor 26 is employed as a driving motor. In FIG. 1 to FIG. 5, 27 represents seal members provided between the rotary means 8 and the bottom disk 5 and between the rotary means 8 and the cover plate 7.

In the loop-conveyor-type flow weigher in accordance with the invention, powder or fine particle material fed from the receiving port is carried in a semicircle through the loop path, and is then delivered from the discharge port. During this conveyance, the weight of such material fed to and being carried in the half loop path can be detected accurately with an electrical signal generated by the load cell, which is provided for the loop conveyor supported at two points on the line of the loop diameter by a balance mechanism.

Such material as powdered coal, which has the physical characteristics of high fluidity and violent flushing, is received and carried in several section chambers formed on the rotary means. This makes it possible to process even such powder as usual without fear of sudden outflow. Furthermore, even when some of the powder material has stuck to the partition vanes and other parts of the rotary means, no error may be produced owing to the tare as a result of balancing in total tare at right and left with respect to the two points on the line of the loop diameter where the loop conveyor is supported. Still furthermore, the loop conveyor can be maintained free from the effect of pressure or impact to be produced when powder falls thereon.

What is claimed is:

1. A loop conveyor type flow weigher comprising a loop conveyor having:

a circular loop path for carrying powder material, means for balancing said loop conveyor at two points on the loop diameter, whereby said loop conveyor is pivotable about said loop diameter at said two points, and a load detector which is disposed orthogonally to said loop diameter and on which the loop conveyor rests, said loop conveyor having a material receiving port provided at one end of said loop diameter in proximity to one of said two points of said means for balancing, and a material discharge port provided diametrically opposite said material receiving port in proximity to other of said two points of said means for balancing, driven rotary means for carrying powder material which is fed to said material receiving port and is continuously carried to said material discharge port, means for counting the number of rotations of said rotary means, and wherein the total weight of said material carried in a semicircle from said material receiving port to said material discharge port along said loop path is calculated by multiplying the weight carried through such semicircle by said rotary means as determined by said load detector, by the total number of revolutions of said rotary means as counted by said counting means.

2. The loop conveyor type flow weigher as claimed in claim 1 wherein rotary means has several partition vanes mounted radially thereon between which section chambers are formed in the loop path so that powder material may be received and carried normally in such individual section chambers.

3. The loop conveyor type flow weigher as claimed in claim 2 wherein each of partition vanes has a soft or flexible seal member provided for sealing the section chambers formed therebetween.

4. The loop conveyor type flow weigher as claimed in claim 3 wherein the seal member is made of felt which is so arranged as to be easily removed for changes.

5. The loop conveyor type flow weigher as claimed in any one of claims 1 to 4 wherein the load detector is an electrical load detector.

* * * * *